United States Patent
Chang et al.

(10) Patent No.: US 8,747,532 B2
(45) Date of Patent: Jun. 10, 2014

(54) FILTER DEVICE

(75) Inventors: Chun-Jung Chang, New Taipei (TW);
Wen-Hsiung Chang, New Taipei (TW);
Ping-Neng Chang, New Taipei (TW);
Run-Cheng Lin, New Taipei (TW)

(73) Assignee: Foxconn Technology Co., Ltd., New Taipei (TW)

( * ) Notice: Subject to any disclaimer, the term of this patent is extended or adjusted under 35 U.S.C. 154(b) by 152 days.

(21) Appl. No.: 13/310,889

(22) Filed: Dec. 5, 2011

(65) Prior Publication Data
US 2013/0032032 A1 Feb. 7, 2013

(30) Foreign Application Priority Data
Aug. 1, 2011 (CN) .......................... 2011 1 0218167

(51) Int. Cl.
*B01D 47/14* (2006.01)
*B01D 47/02* (2006.01)
*B01J 19/30* (2006.01)

(52) U.S. Cl.
CPC ............... *B01J 19/30* (2013.01); *B01D 47/028* (2013.01); *B01J 2219/30408* (2013.01); *B01D 2247/04* (2013.01); *B01J 2219/30226* (2013.01); *B01J 2219/30211* (2013.01); *B01J 2219/30249* (2013.01); *B01J 2219/30207* (2013.01); *B01D 47/14* (2013.01); *B01J 2219/30466* (2013.01); *Y10S 261/72* (2013.01)
USPC .......................... 96/290; 95/211; 261/DIG. 72

(58) Field of Classification Search
None
See application file for complete search history.

(56) References Cited

U.S. PATENT DOCUMENTS

| 3,122,594 | A | * | 2/1964 | Kielback ........................ 261/94 |
| 3,810,348 | A | * | 5/1974 | Byers et al. ..................... 95/212 |
| 4,093,433 | A | * | 6/1978 | Smith ............................ 96/259 |
| 4,208,284 | A | * | 6/1980 | Pretorius et al. .............. 210/767 |
| 4,312,646 | A | * | 1/1982 | Fattinger et al. ............... 96/239 |
| RE35,594 | E | * | 8/1997 | Ruff et al. ...................... 95/212 |
| 5,690,819 | A | * | 11/1997 | Chianh ......................... 210/150 |
| 6,631,890 | B1 | * | 10/2003 | Lau ................................. 261/94 |
| 2004/0041284 | A1 | * | 3/2004 | Lau et al. ....................... 261/94 |
| 2005/0098908 | A1 | * | 5/2005 | Honnell ......................... 261/94 |
| 2005/0263003 | A1 | * | 12/2005 | Fornai et al. .................... 95/211 |
| 2006/0032375 | A1 | * | 2/2006 | Verscharen .................... 95/263 |
| 2011/0136214 | A1 | * | 6/2011 | Cheung ...................... 435/283.1 |

FOREIGN PATENT DOCUMENTS

| CN | 2845893 Y | 12/2006 |
| CN | 201768449 U | 3/2011 |
| TW | 222390 | 4/1994 |
| TW | 271097 | 2/1996 |
| TW | I320075 | 2/2010 |
| TW | M373771 | 2/2010 |

* cited by examiner

Primary Examiner — Duane Smith
Assistant Examiner — Pankti Patel
(74) Attorney, Agent, or Firm — Novak Druce Connolly Bove + Quigg LLP

(57) ABSTRACT

A filter device for filtering dust from air includes a housing, a dust collecting module, a spraying module, and an exhaust. The housing defines an air inlet near a bottom of the housing and an air outlet near a top of the housing. The dust collecting module is installed in the housing between the air inlet and the air outlet. The spraying module is placed in the housing between the dust collecting module and the air outlet. The exhaust is connected to the housing for generating air pressure difference between near the air outlet and near the air inlet, thereby drawing and introducing air containing dust from the bottom of the housing toward the top of the housing via the air inlet.

15 Claims, 5 Drawing Sheets

# FILTER DEVICE

BACKGROUND

1. Technical Field

The present disclosure relates generally to filter devices, especially, to a filter device for filtering dust from air.

2. Description of Related Art

Dust in air worsens a working environment. When the dust concentration in the air is too high, a dust explosion may be easily generated. A filter device generally includes a filter net and a spraying module to lower the dust concentration in the air. However, the mesh in the filter net is easily blocked, and this decreases the filtering efficiency of the filter device.

Therefore, there is room for improvement within the art.

BRIEF DESCRIPTION OF THE DRAWINGS

The elements in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
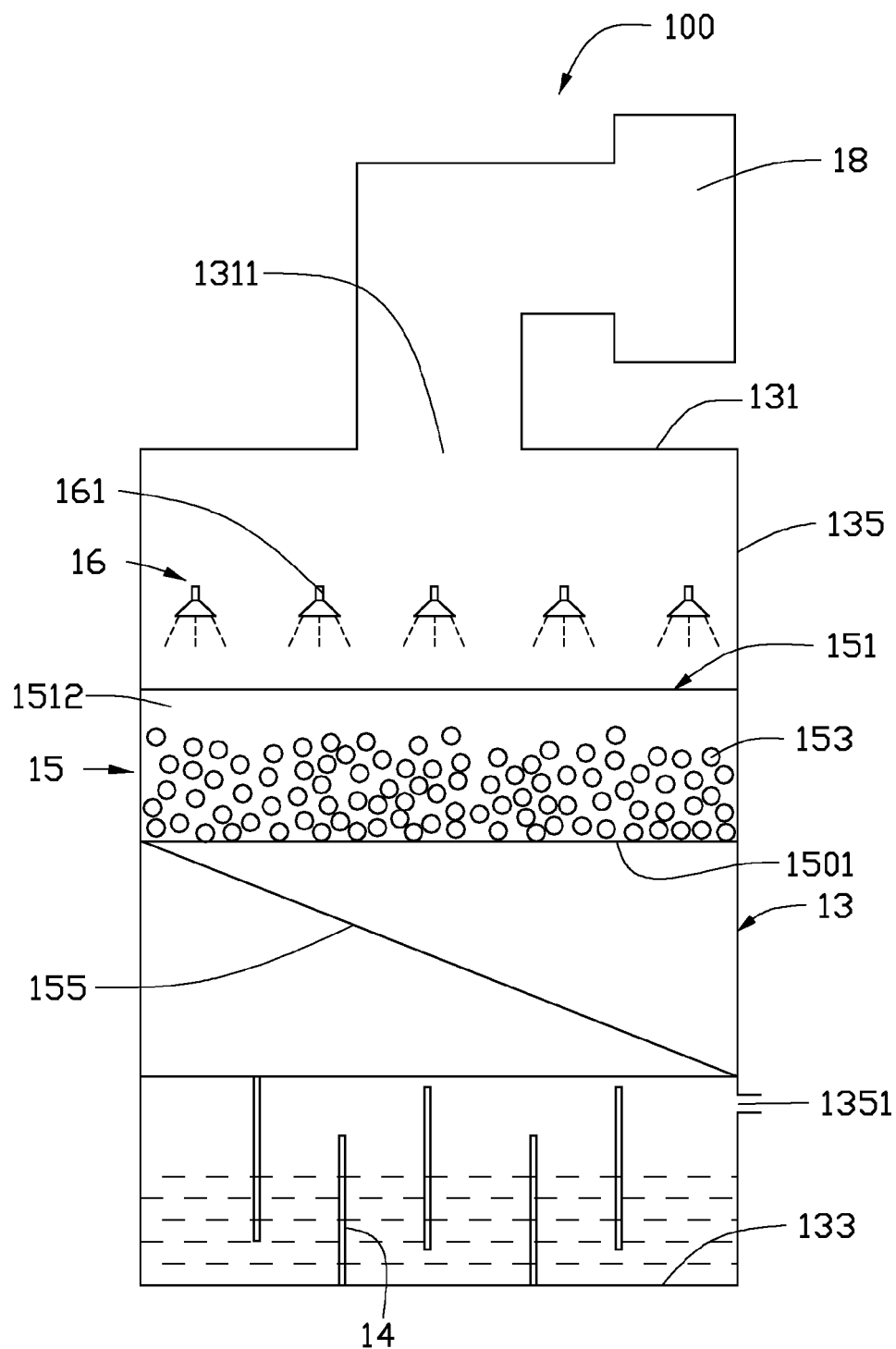
FIG. 1 is a schematic, cross-sectional view of a first embodiment of a filter device including a dust collecting member.

Referring to FIG. 1, a first embodiment of a filter device 100 for filtering dust from the air includes a housing 13, a plurality of filtering nets 14, a dust collecting module 15, a spraying module 16 and an exhaust 18.

The housing 13 is a substantially hollow cuboid, and includes a top wall 131, a bottom wall 133 opposite to the top wall 131, and a peripheral wall 135 interconnecting the top wall 131 to the bottom wall 133. An air outlet 1311 is defined in the top wall 131, and is connected to the exhaust 18. An air inlet 1351 is defined in the peripheral wall 135 adjacent to the bottom wall 133. Air containing dust and water containing dust are introduced into the housing 13 through the air inlet 1351. Water is received in the housing 13, and a water level is below the air inlet 1351. When the exhaust 18 is working, an air pressure near the air outlet 1311 is lower than that near the air inlet 1351, such that air containing dust is drawn and moves towards the air outlet 1311.

The plurality of filtering nets 14 are securely placed in the housing 13 adjacent to the air inlet 1351, and are spaced from each other for filtering dust from water. A part of each of the plurality of filtering nets 14 is immersed into the water in the housing 13. In an alternative embodiment, the filter device 100 can include just one filtering net 14.

The dust collecting module 15 is installed in the housing 13 above the air inlet 1351, and includes a receiving member 151, a plurality of dust collecting members 153, and a water screen generator 155. The receiving member 151 is connected to the peripheral wall 135 of the housing 13, located away from the air inlet 1351 for a predetermined distance. A plurality of water holes (not shown) are defined in the receiving member 151. In the first embodiment, the receiving member 151 includes two boards 1501. The two boards 1501 are spaced from each other, and each board 1501 is connected to the peripheral wall 135, such that the two boards 1501 and the peripheral wall 135 cooperatively form a receiving space 1512.

Figure 2:
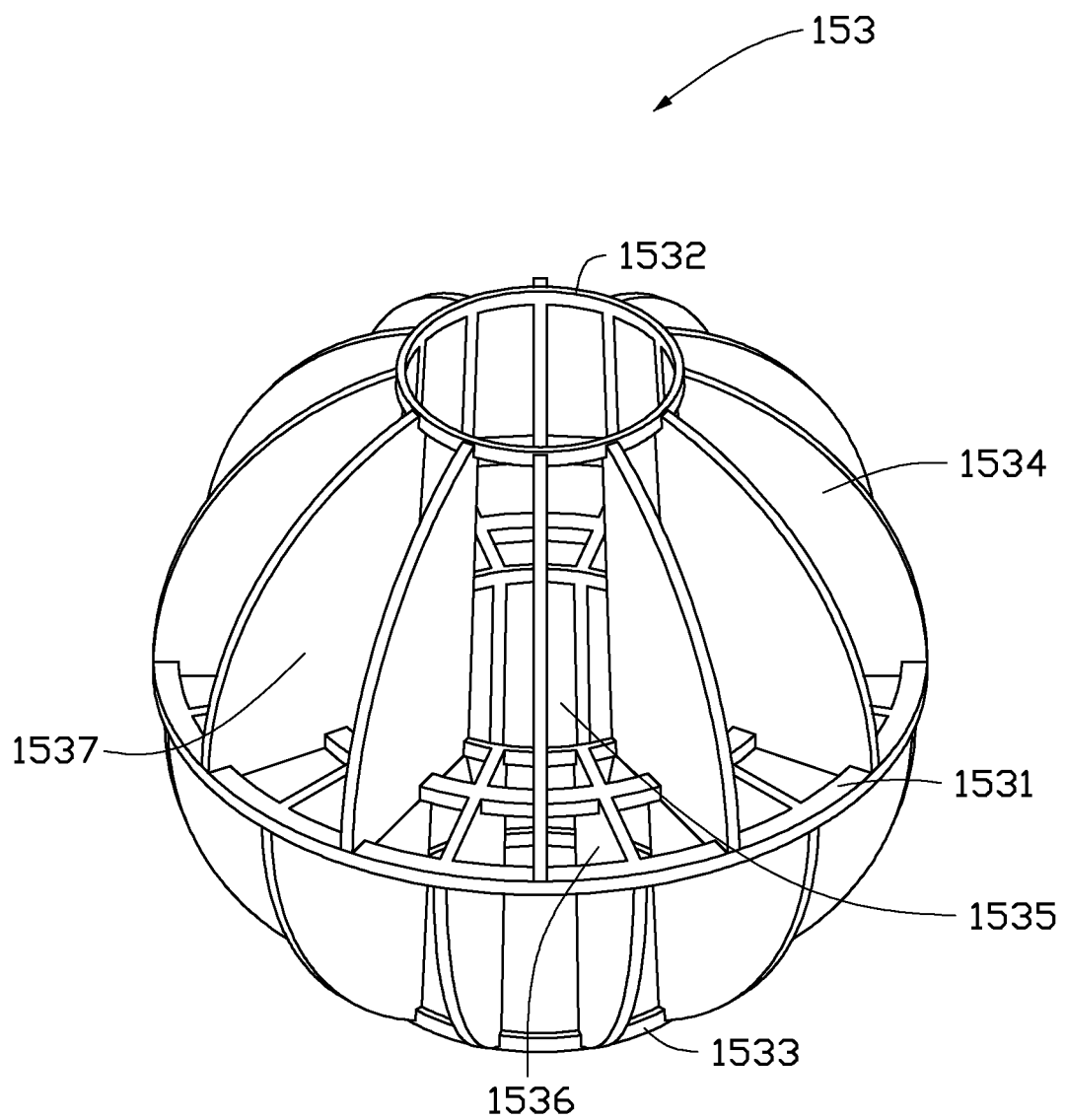
FIG. 2 is an isometric view of the dust collecting member of the filter device of FIG. 1.
Figure 3:
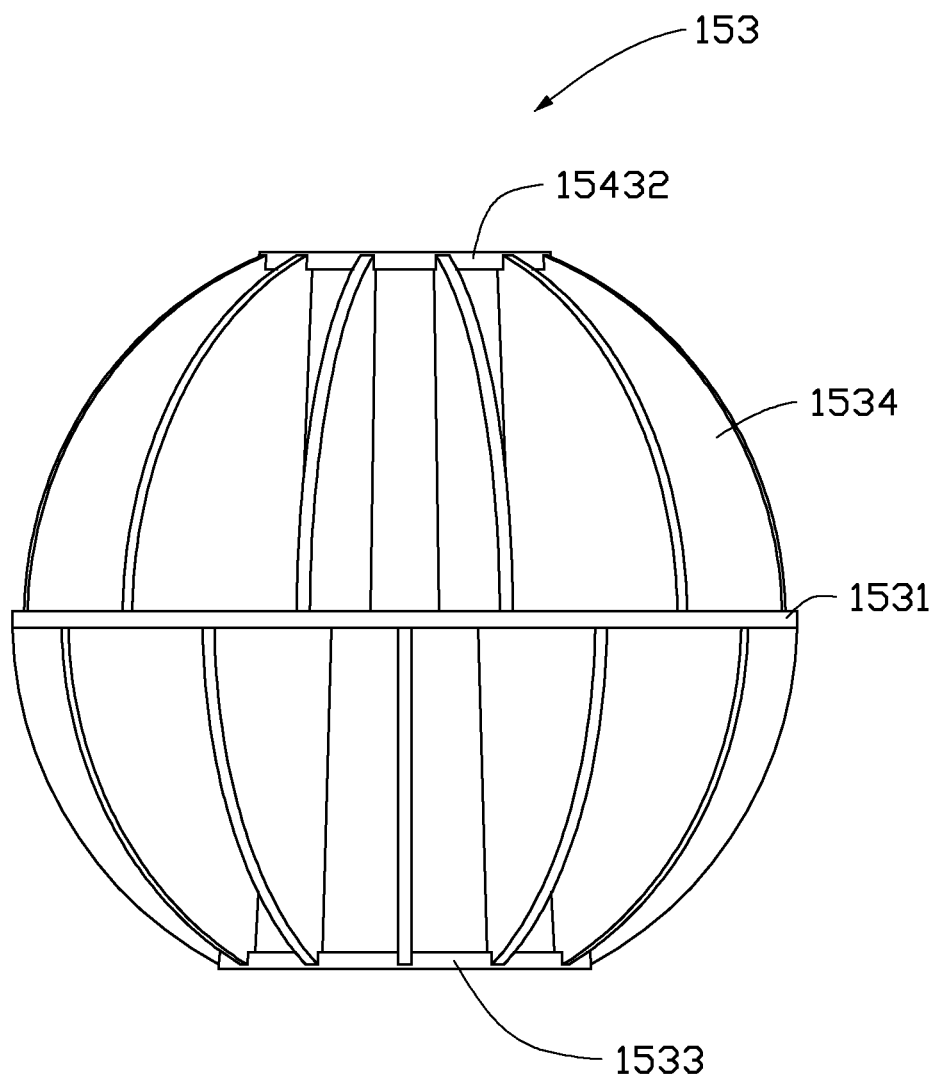
FIG. 3 is a front view of the dust collecting member of FIG. 2.
Figure 4:
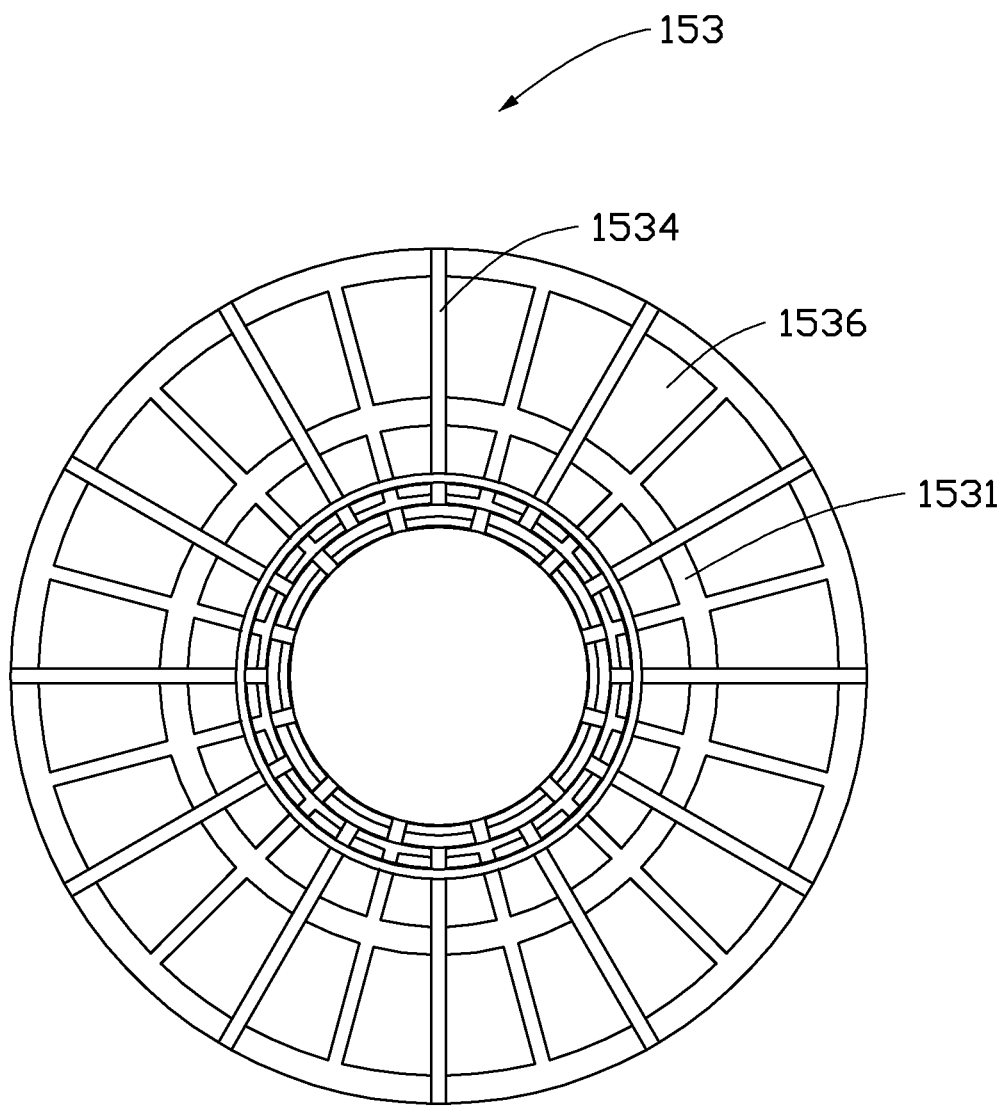
FIG. 4 is a top view of the dust collecting member of FIG. 2.

The dust collecting members 153 are received in the receiving space 1512. Also referring to FIGS. 2 through 4, each dust collecting member 153 is substantially a truncated hollow sphere. The dust collecting member 153 includes a connecting surface 1531, a first end 1532, a second end 1533, and a plurality of collecting leaves 1534. The connecting surface 1531 has the largest cross section area of the sphere. A shaft hole 1535 is defined at a center of the connecting surface 1531. A plurality of through holes 1536 are defined on the connecting surface 1531 around the shaft hole 1535. The first end 1532 and the second end 1533 are placed on opposite sides of the connecting surface 1531, respectively. The first end 1532 is substantially circular. An inner diameter of the first end 1532 is greater than a diameter of the shaft hole 1535 of the connecting surface 1531. The second end 1533 is similar to the first end 1532, except that an inner diameter of the second end 1533 is smaller than the diameter of the shaft hole 1535. Each collecting leaf 1534 extends from the connecting surface 1531 to the first end 1532 or to the second end 1533, and is substantially arc-shaped and sheet-like. The collecting leaves 1534 form two groups. One group of the collecting leaves 1534 is sandwiched between the first end 1532 and the connecting surface 1531, and the other group of the collecting leaves 1534 is sandwiched between the second end 1533 and the connecting surface 1531. The two groups of the collecting leaves 1534 are staggeredly arranged on the opposite sides of the connecting surface 1531, such that a plurality of dust collecting spaces 1537 are defined. In the first embodiment, the dust collecting members 153 are stacked multi-layered in the receiving space 1512. Each dust collecting member 153 is made of plastic.

In an alternative embodiment, the receiving member 151 can be net-like or a housing can be defining a plurality of water holes. The dust collecting member 153 can be of other shapes, such as ellipse, cubic, or cone, and can be made of other materials, such as metal. The collecting leaf 1534 can form a plurality of protrusions to increase a surface area of the collecting leaf 1534.

Referring to FIG. 1 again, the water screen generator 155 is a substantially square board defining a plurality of water holes (not shown) to generate water screen. The water screen generator 155 is placed in the housing 13, and is connected to the peripheral wall 135 of the housing 13. In the first embodiment, the water screen generator 155 is slantingly placed between the air inlet 1351 of the housing 13 and the receiving member 151. In an alternative embodiment, the filter device 100 can include another water screen generator 155, and the other water screen generator 155 can be slantingly placed in the air outlet 1311 and the receiving member 151, such that dust in the air can be filtered twice by water screen.

The spraying module 16 is securely placed on one side of the dust collecting module 15 opposite to the air inlet 1351, and adjacent to the top wall 131 of the housing 13. Thus, water spray generated by the spraying module 16 falls onto the dust collecting members 153, and a falling direction of travel of the water spray is opposite to a moving direction of travel of the air containing dust. In the first embodiment, the spraying module 16 includes a plurality of spraying nozzles arranged in a straight line.

In a filtering process, the air containing dust first goes through the water screen generated by the water screen generator 155 under an air pressure, then goes through the dust collecting members 153 and the water spray generated by the spraying module 16, and finally, the air is discharged through the air outlet 1311. A plurality of air gaps are formed between two adjacent collecting leaves 1534 and between two adjacent dust collecting members 153, and a water film is formed on the surfaces of the collecting leaves 1534. Thus, when the air containing dust moves towards the air outlet 1311 through the air gaps, the dust contacts with and is adsorbed by the water film. Because the dust collecting members 153 are acted upon by two forces having opposite directions, in which one force is exerted by the air pressure, and the other force is exerted by the water spray. Then, the dust collecting members 153 are shaken up or down, and collide with each other, therefore, the contact time is prolonged, and the contact force is increased. As a result, the dust fully contacts with the water film, and is adsorbed more effectively.

In an alternative embodiment, the air outlet 1311 can be defined in the peripheral wall 135, and the air outlet 1311 and the air inlet 1351 are defined on opposite sides of the dust collecting module 15. A gate for maintenance can be defined in the peripheral wall 135. The filter device 100 can also include a water recycling module (not shown), and the water recycling module can be connected to the housing 13, the spraying module 16 and the water screen generator 155 to recycle water. A filtering layer can be placed between the spraying module 16 and the air outlet 1311 to further filter dust from the air.

Figure 5:
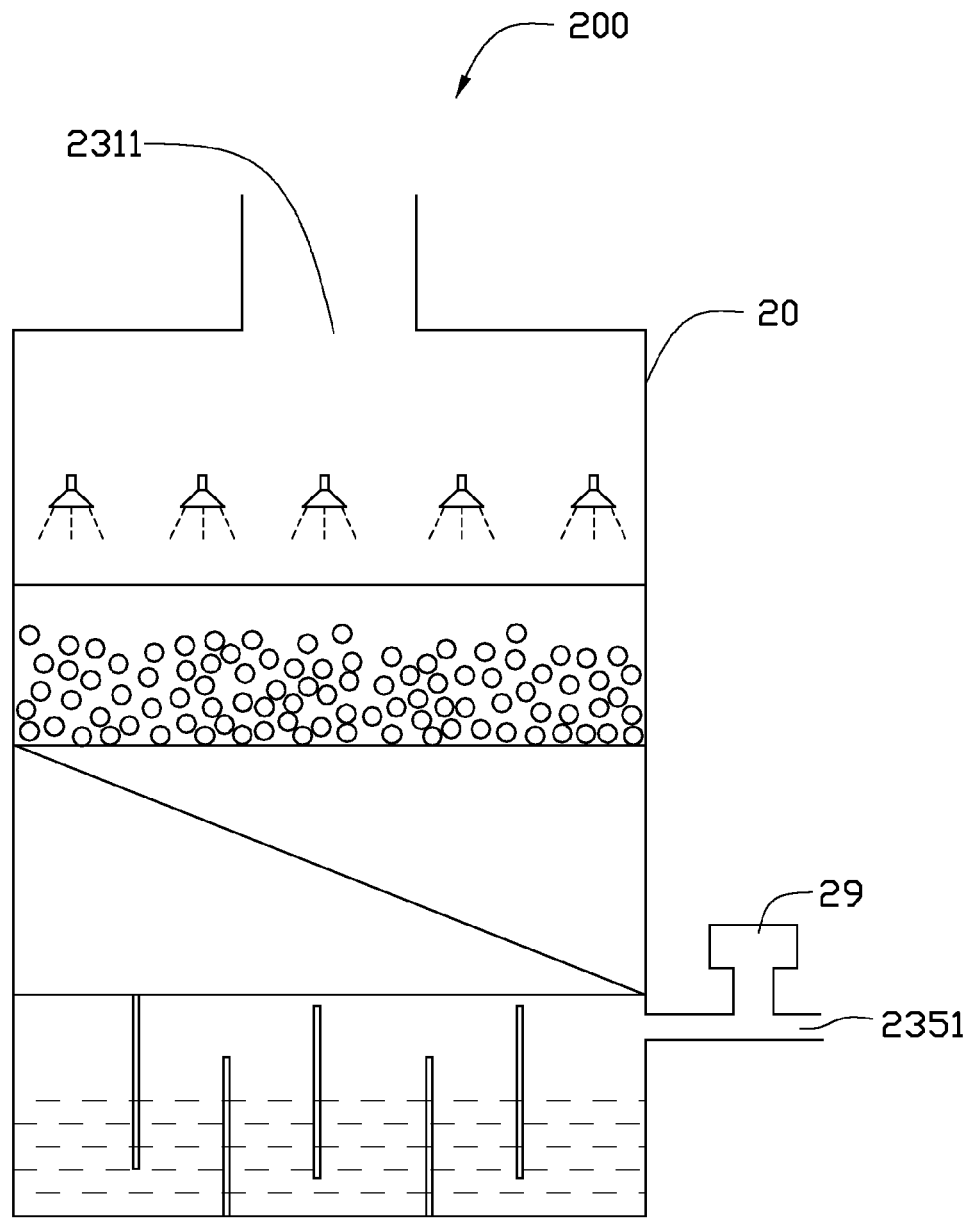
FIG. 5 is a schematic, cross-sectional view of a second embodiment of a filter device.

Referring to FIG. 5, a second embodiment of a filter device 200 is similar to the first embodiment of the filter device 100, except that the filter device 200 includes a blast blower 29 connected to an air inlet 2351 instead of the exhaust, for making the air pressure near the air inlet 2351 greater than that near an air outlet 2311, such that the air containing dust is introduced from a bottom of a housing 20 toward a top of the housing 20 via the air inlet 2351.

It is to be understood, however, that even through numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A filter device for filtering dust from air, comprising:
a housing defining an air inlet at a bottom of the housing and an air outlet at a top of the housing;
a dust collecting module placed in the housing between the air inlet and the air outlet, the dust collecting module comprising a receiving member and a plurality of dust collecting members moveably received in the receiving member, wherein each dust collecting member comprises a connecting surface, a substantially circular first end, a substantially circular second end, and a plurality of collecting leaves, the connecting surface defines a shaft hole, the first end and the second end are respectively placed on opposite sides of the connecting surface, the plurality of collecting leaves forms two groups, each of the plurality collecting leaves of one group extends from one side of the connecting surface to the first end, and each of the plurality collecting leaves of the other group extends from the opposite side of connecting surface to the second end, and the two groups of the collecting leaves are staggeredly arranged on the opposite sides of the connecting surface, an inner diameter of the first end is greater than a diameter of the shaft hole, and an inner diameter of the second end is smaller than the diameter of the shaft hole;
a spraying module installed in the housing between the dust collecting module and the air outlet; and
an exhaust connected to the housing for generating air pressure difference between near the air outlet and near the air inlet, thereby drawing and introducing air containing dust from the bottom of the housing toward the top of the housing via the air inlet.

2. The filter device for filtering dust from air of claim 1, wherein the housing is substantially hollow cuboid, and comprises a top wall, a bottom wall opposite to the top wall, and a peripheral wall interconnecting the top wall to the bottom wall.

3. The filter device for filtering dust from air of claim 2, wherein the air inlet is defined in the peripheral wall, and the air outlet is defined in the top wall.

4. The filter device for filtering dust from air of claim 2, wherein the receiving member is connected to the peripheral wall.

5. The filter device for filtering dust from air of claim 1, wherein a plurality of through holes are defined in the connecting surface.

6. The filter device for filtering dust from air of claim 1, wherein the dust collecting members are stacked multi-layered in the receiving member.

7. The filter device for filtering dust from air of claim 1, wherein the dust collecting module comprises a water screen generator connected to the peripheral wall.

8. The filter device for filtering dust from air of claim 7, wherein the water screen generator is slantingly placed between the air inlet and the dust collecting module or between the air outlet and the dust collecting module.

9. The filter device for filtering dust from air of claim 1, wherein the exhaust is connected to the air outlet.

10. The filter device for filtering dust from air of claim 1, further comprising one or more filtering net placed in the housing adjacent to the air inlet.

11. A filter device for filtering dust from air, comprising:
a housing defining an air inlet near a bottom of the housing and an air outlet near a top of the housing;
a dust collecting module installed in the housing between the air inlet and the air outlet, and comprising a receiving member and a plurality of dust collecting members moveably received in the receiving member, wherein each dust collecting member comprises a connecting surface, a substantially circular first end, a substantially circular second end, and a plurality of collecting leaves, the connecting surface defines a shaft hole, the first end and the second end are respectively placed on opposite sides of the connecting surface, the plurality of collecting leaves forms two groups, each of the plurality collecting leaves of one group extends from the connecting surface to the first end, each of the plurality collecting leaves of the other group extends from the opposite side of the connecting surface to the second end, and the two groups of the collecting leaves are staggeredly arranged on the opposite sides of the connecting surface, an inner diameter of the first end is greater than a diameter of the shaft hole, and an inner diameter of the second end is smaller than the diameter of the shaft hole;
a spraying module placed in the housing between the dust collecting module and the air outlet; and
an exhaust connected to the air outlet for generating air pressure difference between near the air outlet and near the air inlet, thereby drawing and introducing air containing dust from the bottom of the housing toward the top of the housing via the air inlet.

12. The filter device for filtering dust from air of claim 11, wherein the housing is substantially hollow cuboid, and comprises a top wall, a bottom wall opposite to the top wall, and a peripheral wall interconnecting the top wall to the bottom wall, the air inlet is defined in the peripheral wall, and the air outlet is defined in the top wall.

13. The filter device for filtering dust from air of claim 12, wherein the receiving member is connected to the peripheral wall.

14. The filter device for filtering dust from air of claim 11, wherein a plurality of through holes are further defined in the connecting surface.

15. The filter device for filtering dust from air of claim 11, wherein the dust collecting module comprises a water screen generator connected to the peripheral wall, and the water screen generator is slantingly placed between the air inlet and the dust collecting module or between the air outlet and the dust collecting module.

\* \* \* \* \*